(12) United States Patent
Cheung

(10) Patent No.: US 10,110,105 B2
(45) Date of Patent: Oct. 23, 2018

(54) DISC POWER GENERATOR

(71) Applicants: Wang Fung Cheung, New Territories, Hong Kong (CN); Bill Loh, Singapore (SG)

(72) Inventor: Wang Fung Cheung, Hong Kong (CN)

(73) Assignees: Wang Fung Cheung, Shatin, New Territories, Hong Kong (CN); Bill Loh, Singapore (SG)

( * ) Notice: Subject to any disclaimer, the term of this patent is extended or adjusted under 35 U.S.C. 154(b) by 129 days.

(21) Appl. No.: 15/028,475

(22) PCT Filed: Oct. 9, 2014

(86) PCT No.: PCT/CN2014/088158
§ 371 (c)(1),
(2) Date: Apr. 11, 2016

(87) PCT Pub. No.: WO2015/051740
PCT Pub. Date: Apr. 16, 2015

(65) Prior Publication Data
US 2016/0241117 A1    Aug. 18, 2016

(30) Foreign Application Priority Data

Oct. 10, 2013 (CN) .......................... 2013 1 0470189

(51) Int. Cl.
*H02K 21/26* (2006.01)
*H02K 1/17* (2006.01)
(Continued)

(52) U.S. Cl.
CPC ............... *H02K 21/26* (2013.01); *H02K 1/17* (2013.01); *H02K 1/182* (2013.01); *H02K 3/26* (2013.01);
(Continued)

(58) Field of Classification Search
CPC ........ H02K 1/17; H02K 11/046; H02K 19/16; H02K 21/26; H02K 1/182; H02K 7/003
(Continued)

(56) References Cited

U.S. PATENT DOCUMENTS 3,308,322 A * 3/1967 Hahn ...................... H02K 3/26
310/239
4,605,873 A * 8/1986 Hahn ..................... H02K 23/54
310/154.06

(Continued)

FOREIGN PATENT DOCUMENTS

| CN | 103348569 | 1/2004 |
| CN | 101951106 | 1/2011 |

(Continued)

OTHER PUBLICATIONS

Search Report.

*Primary Examiner* — John K Kim
(74) *Attorney, Agent, or Firm* — Alix, Yale & Ristas, LLP

(57) ABSTRACT

A disc power generator comprises a first housing and a second housing. The first housing and the second housing are locked and fixed together to enclose a receiving space. The disc power generator further comprises a first magnet set and a second magnet set provided in the receiving space. A plane where the first magnet set is located is parallel to a plane where the second magnet set is located, and a unidirectional magnetic field is formed between the first magnet set and the second magnet set. An armature parallel to the plane where the first magnet set is located is provided between the first magnet set and the second magnet set. The armature comprises a board. On the board, with the board as the center, multiple coils arranged at equal intervals in a circumferential form are fixed mounted. The coils are in a spiral form, the plane where the coils are (Continued)

located is parallel to the board. The multiple coils are electrically connected to each other through circuits on the board. The armature in the disc power generator is insusceptible to magnetic reluctance and rotates stably.

7 Claims, 6 Drawing Sheets

(51) Int. Cl.
    *H02K 19/16* (2006.01)
    *H02K 11/04* (2016.01)
    *H02K 1/18* (2006.01)
    *H02K 3/47* (2006.01)
    *H02K 3/26* (2006.01)
    *H02K 7/00* (2006.01)

(52) U.S. Cl.
    CPC ............... *H02K 3/47* (2013.01); *H02K 19/16* (2013.01); *H02K 7/003* (2013.01); *H02K 11/046* (2013.01)

(58) Field of Classification Search
    USPC ................................. 310/89, 154.06, 268, 90
    IPC ......................... H02K 1/17, 11/04, 19/16, 21/26
    See application file for complete search history.

(56) References Cited

U.S. PATENT DOCUMENTS

| | | | |
|---|---|---|---|
| 8,723,379 B2* | 5/2014 | Liao | H02K 7/183 |
| | | | 180/65.1 |
| 2004/0001281 A1 | 1/2004 | Fujita et al. | |
| 2005/0057112 A1* | 3/2005 | Lopatinsky | F04D 25/066 |
| | | | 310/208 |
| 2006/0055262 A1* | 3/2006 | Kaneko | H02K 1/17 |
| | | | 310/154.06 |
| 2006/0244328 A1* | 11/2006 | Guo | H02K 23/04 |
| | | | 310/154.06 |
| 2016/0241117 A1* | 8/2016 | Cheung | H02K 3/47 |

FOREIGN PATENT DOCUMENTS

| | | |
|---|---|---|
| CN | 102364844 | 2/2012 |
| CN | 103580310 | 2/2014 |
| CN | 203589857 | 5/2014 |

\* cited by examiner

DISC POWER GENERATOR

TECHNICAL FIELD

This invention relates to power generators, especially relating to disc power generators.

BACKGROUND ART

A traditional power generator generally comprises a stator core wound with enameled wire coil and an annular magnetic pole rotor coaxially arranged around the stator core and made from permanent magnetic steel. The annular magnetic pole rotor uses a lot of magnetic steel and production costs are high. The coil structure on the stator core is very cramped with troublesome wiring.

In this context, the disc power generator was developed. In existing disc power generators, the magnetic steel is glued on upper and lower covers, and an armature is rotatably arranged between the upper and lower covers. However, the coil is not glued using a base plate in the armature of the existing disc power generator, but is simply glued together, which leads to non-uniform thickness of coil winding, further leads to unstable rotation of the armature, and needs a larger rotation space for the armature.

SUMMARY OF THE INVENTION

This invention aims to provide a disc power generator in view of the high production costs and troublesome wiring of existing power generators.

A disc power generator comprises a first housing and a second housing. The first housing and the second housing are locked and fixed together to enclose a receiving space. The middle part of the first housing have shaft holes arranged respectively in the middle part of the first housing and the second housing. The disc power generator further comprises a first magnet set and a second magnet set fixedly provided in the receiving space. The first magnet set comprises multiple platelike first magnets arranged at equal intervals in a circumferential form on a same plane, and the second magnet set comprises multiple platelike second magnets arranged at equal intervals in a circumferential form on a same plane. The first magnet set is located on a plane parallel to the plane where the second magnet set is located, and the two magnetic poles of any one of the first magnets are arranged in a direction perpendicular to the plane where the first magnet set is located, the two magnetic poles of any one of the second magnets are arranged in a direction perpendicular to the plane where the second magnet set is located, and a unidirectional magnetic field is formed between the first magnet set and the second magnet set. Between the first magnet set and the second magnet set there is a disc-shaped armature arranged parallel to the plane where the first magnet set is located. The armature comprises a disc-shaped board parallel to the plane where the first magnet set is located. At the middle part of the board there is a rotating shaft is fixedly axially mounted. Both ends of the rotating shaft are respectively rotatably run in the shaft holes. On the board, there are multiple coils fixedly mounted at the center of the board between the first magnet set and the second magnet set, and arranged at equal intervals in a circumferential form on a same plane. The coils are in a spiral form and are on the same plane parallel to the board. The multiple coils are electrically connected together and through the rotation of the armature generate unidirectional alternating current.

In the disc power generator of this invention, on the inner wall of the first housing and the second housing there is a first fixed groove arranged corresponding to the first magnet set and a second fixed groove arranged corresponding to the second magnet set. The multiple first magnets are fixedly inserted in the first fixed groove to form the first magnet set. The multiple second magnets are fixedly inserted in the second fixed groove to form the second magnet set.

In the disc power generator of this invention, the board is disc-shaped, and is parallel to the plane where the first magnet set is located, and is provided with a cylindrical fixed station coaxially connected to the middle part of the board. The middle part of the board there is an axially arranged mounting hole running through the board. The rotating shaft comprises a cylindrical shaft core seat and a cylindrical shaft core. One end of the shaft core seat is axially provided with a first fixed flange corresponding to the mounting hole, while the other end is fixedly sheathed with a first bearing, and rotatably runs in the shaft hole of the second housing. One end of the shaft core is axially provided with a third fixed groove, while the other end rotatably runs in the shaft hole of the first housing, and is axially provided with a fourth fixed groove to fix the shaft core on the output shaft of the motor. The first fixed flange on the shaft core seat fixedly runs in the mounting hole and runs through the board. The first fixed flange runs through the protruding part of the board, fixedly runs on the second bearing, and fixedly runs in the third fixed groove of the shaft core.

In the disc power generator, the side face of the fixed station is provided with multiple axially extending wavy teeth arranged at equal intervals in a circumferential form on a same plane with the axis of the fixed station as the center of a circle. On the side face of the fixed station between each adjacent wavy teeth there is a holding surface formed for the coils to hold against. On the board outside the fixed station there are multiple fixed flanges arranged on a same plane at equal intervals in a circumferential form with the center of the board as the center of the circle and corresponding to the wavy teeth. The holding surface between each adjacent wavy teeth and the fixed flanges corresponding to each adjacent wavy teeth form a fixed cavity to fix the coils, so that the outer edge of the coils are respectively held against the holding surface of the fixed station and the sidewalls of the corresponding fixed flanges.

In the disc power generator, the board is equipped with a bonding pad set, the bonding pad set comprising three bonding pads used for current output. Each of the coils has a first tap derived from the center part of the coil and a second tap derived from the side of the coil. All of the coils fixed on the board have the same winding direction, and are divided into a first coil assembly, a second coil assembly and a third coil assembly. The first coil assembly, the second coil assembly and the third coil assembly comprise equal number of the coils, and the coils in the first coil assembly, the coils in the second coil assembly and the coils in the third coil assembly are alternately arranged in a circumferential form. The first tap of the first coil in the first coil assembly, the first tap of the first coil in the second coil assembly and the first tap of the first coil in the third coil assembly are electrically connected together. The second tap of the first coil in the first coil assembly is electrically connected to the first tap of the next coil in the first coil assembly; likewise, the second tap of each coil in the first coil assembly is electrically connected to the first tap of the next coil, and the second tap of the last coil in the first coil assembly is electrically connected to one of the bonding pads in the bonding pad set.

The second tap of the first coil in the second coil assembly is electrically connected to the first tap of the next coil in the second coil assembly; likewise, the second tap of each coil in the second coil assembly is electrically connected to the first tap of the next coil, and the second tap of the last coil in the second coil assembly is electrically connected to another of the bonding pad in the bonding pad set. The second tap of the first coil in the third coil assembly is electrically connected to the first tap of the next coil in the third coil assembly; likewise, the second tap of each coil in the third coil assembly is electrically connected to the first tap of the next coil, and the second tap of the last coil in the third coil assembly is electrically connected to the third bonding pad in the bonding pad set.

In the disc power generator, the number of the first magnets in the first magnet set is even, and the number of the coils fixed on the board is more than the number of the first magnets in the first magnet set.

In the disc power generator, the ratio of the number of the coils fixed on the board to the number of the first magnets in the first magnet set is 3:2.

The disc power generator uses a board, and the coils are uniformly distributed on the board in a circumferential form. With this structure, the armature can rotate more stably, so as to minimize the distance between the first magnet set and the second magnet set, and reduce heat generation. With this structure, the power generator won't produce phase-shifting voltage, and directly outputs maximum voltage. Further, the ratio of the number of coils fixed on the board to the number of the first magnets in the first magnet set is 3:2. With this structure, the armature is not susceptible to magnetic reluctance, and rotates more stably.

BRIEF DESCRIPTION OF THE DRAWINGS

This invention will be further illustrated in the light of the drawings and embodiments below. In the drawings.

DETAILED DESCRIPTION OF THE INVENTION

Figure 1:
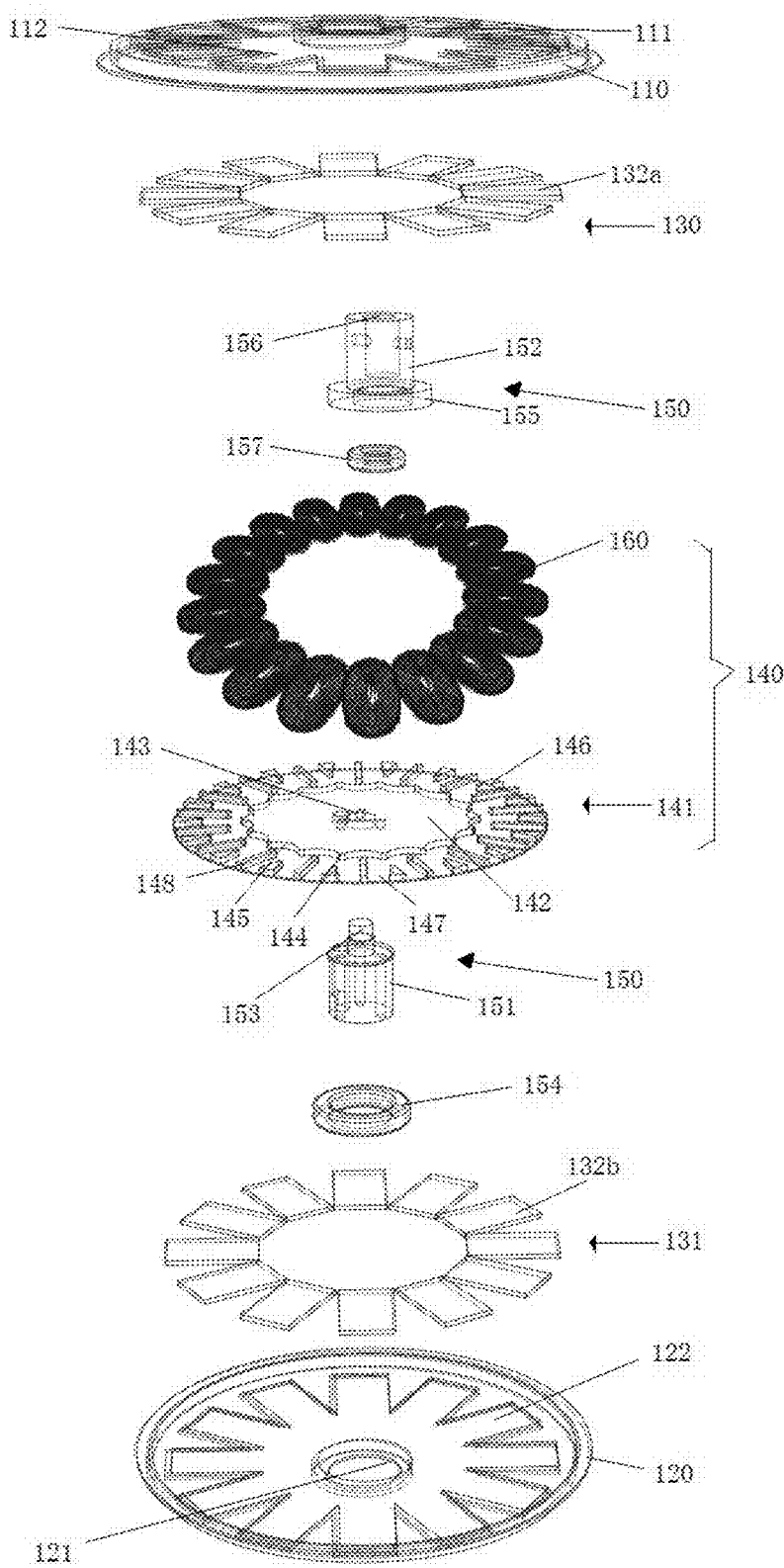
FIG. 1 is the schematic diagram of the assembly/disassembly of an embodiment of the disc power generator in this invention.

FIG. 1 shows a preferred embodiment of the disc power generator in this invention, comprising a first housing 110 and a second housing 120. The first housing 110 and the second housing 120 are locked and fixed together to enclose a receiving space. The middle part of the first housing 110 and the second housing 120 have shaft holes 111 and 121 arranged respectively.

Figure 2:
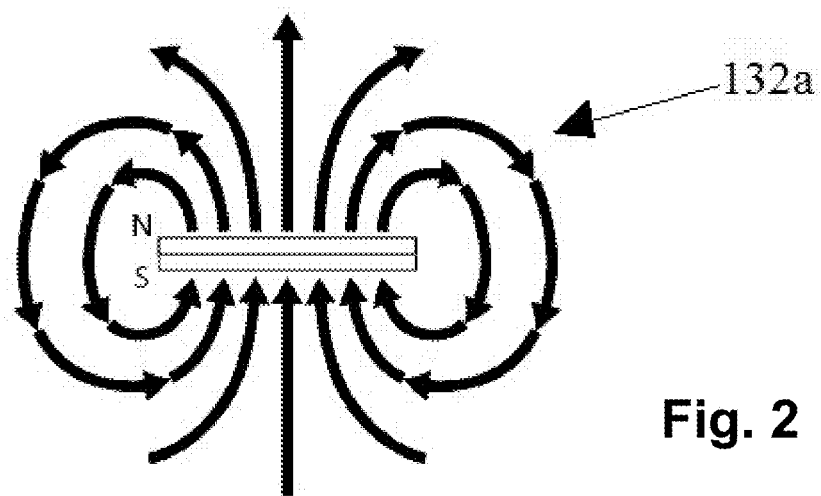
FIG. 2 is the schematic diagram of the first magnet or the second magnet as shown in FIG. 1.
Figure 3:
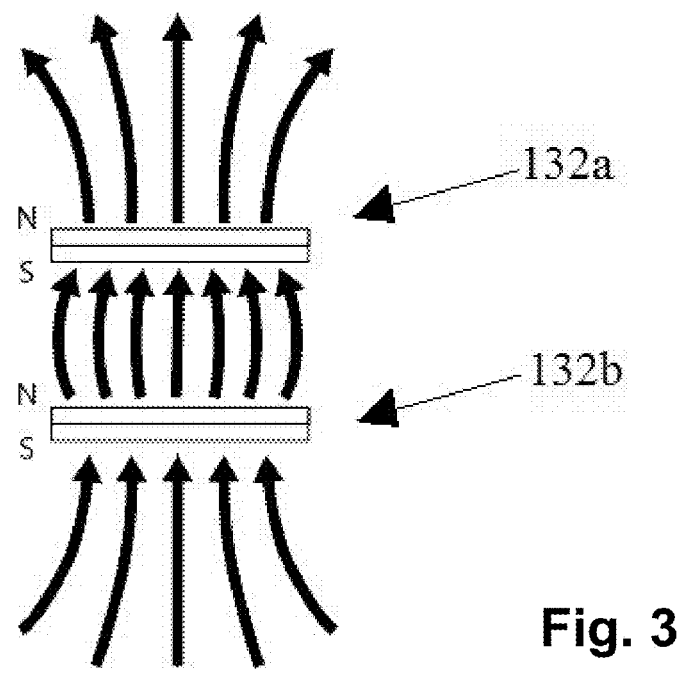
FIG. 3 is the schematic diagram of the first magnet and the second magnet opposite to the first magnet as shown in FIG. 1.

With reference to FIG. 1, the disc power generator further comprises a first magnet set 130 and a second magnet set 131 fixedly provided in the receiving space. The first magnet set 130 comprises multiple platelike first magnets 132a arranged at equal intervals in a circumferential form on a same plane, and the second magnet set 131 comprises multiple platelike second magnets 132b arranged at equal intervals in a circumferential form on a same plane. The first magnet set 130 is located on a plane parallel to the plane where the second magnet set 131 is located. With reference to FIG. 2, the two magnetic poles of any one of the first magnets 132a are arranged in a direction perpendicular to the plane where the first magnet set 130 is located, and the two magnetic poles of any one of the second magnets 132b are arranged in a direction perpendicular to the plane where the second magnet set 131 is located. With reference to FIG. 3, a unidirectional magnetic field is formed between the first magnet set 130 and the second magnet set 131.

Specifically, in this embodiment, on the inner wall of the first housing 110 and the second housing 120 there is a first fixed groove 112 arranged corresponding to the first magnet set 130 and a second fixed groove 122 arranged corresponding to the second magnet set 131. Multiple first magnets 132a are fixedly inserted in the first fixed groove 112 to form the first magnet set 130. Multiple second magnets 132b are fixedly inserted in the second fixed groove 122 to form the second magnet set 131. Furthermore, the first magnets 132a and the second magnets 132b are all made from neodymium iron boron magnets. The first magnet set 130 is composed of 12 first magnets 132a, and the second magnet set 131 is composed of 12 second magnets 132b. The magnetic pull force between the first magnet set 130 and the second magnet set 131 built in the receiving space formed by locking and fixing the first housing 110 and the second housing 120 is more than 1000 pounds. Therefore, the first housing 110 and the second housing 120 are made through metal stamping with scientific design, so as to bear the magnetic pull force of more than 1000 pounds with minimum use of materials.

With reference to FIG. 1, between the first magnet set 130 and the second magnet set 131 there is a disc-shaped armature 140 arranged parallel to the plane where the first magnet set 130 is located. The armature 140 comprises a disc-shaped board 141 parallel to the plane where the first magnet set 130 is located. At the middle part of the board 141 there is a rotating shaft 150 that is fixedly axially mounted by a screw or a pin bolt. Both ends of the rotating shaft 150 respectively rotatably run in the shaft holes 111 and 121. To be specific, in this embodiment, the board 141 is disc-shaped, is made from the raw material of phenolic resin (bakelite) and made through thermoplastic curing with urotropine as the curing agent, has excellent heat resistance, flame resistance, water resistance and insulativity, good acid resistance but poor alkali resistance, as well as good mechanical performance and electrical performance, and can maintain its state in complex outdoor weather conditions (such as scorching heat and acid rain). The material used to make the board 141 is not limited to bakelite, and the board 141 can be made from all materials having heat resistance, flame resistance and insulativity, so that the board 141 can maintain its state in complex outdoor weather conditions (such as scorching heat and acid rain). Here, it is necessary to stress that the flatness and the ability to maintain its state of the board 141 have significant influence on the power generation performance of the disc power generator in this invention. The board 141 is printed with circuits made of copper foil, is parallel to the plane where the first magnet set 130 is located, and is provided with a cylindrical fixed station 142 coaxially connected to the board 141 in the middle part. In the middle part of the board 141 there is an axially arranged mounting hole 143 running through the board 141.

Figure 4:
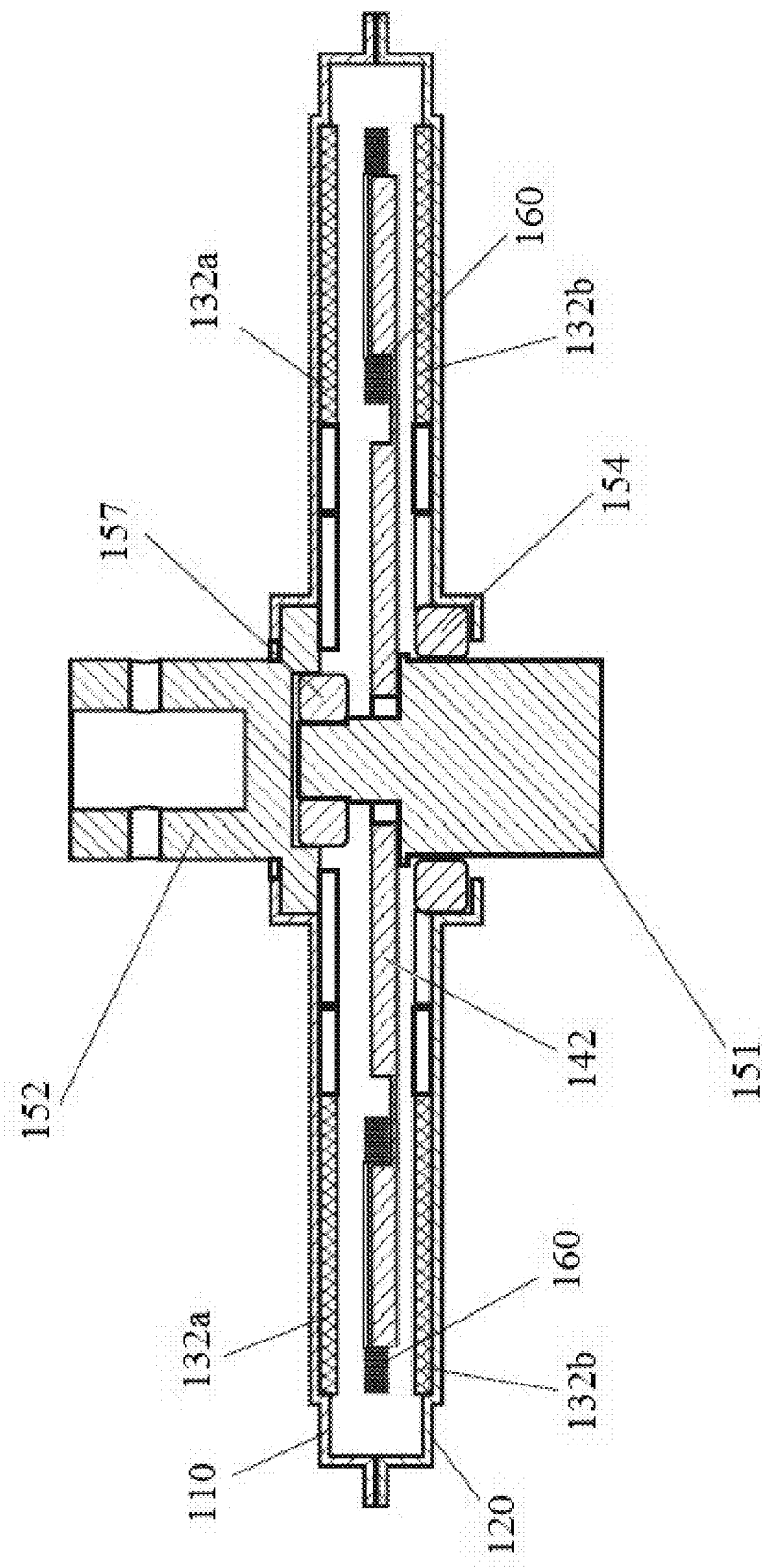
FIG. 4 is the schematic diagram of the disc power generator as shown in FIG. 1.

With reference to FIG. 1, in this embodiment, the rotating shaft 150 comprises a cylindrical shaft core seat 151 and a cylindrical shaft core 152. One end of the shaft core seat 151 is axially provided with a first fixed flange 153 corresponding to the mounting hole 143, while the other end is fixedly sheathed with a first bearing 154, and rotatablely runs in the shaft hole 121 of the second housing 120. One end of the shaft core 152 is axially provided with a third fixed groove 155, while the other end rotatably runs in the shaft hole 111 of the first housing 110, and is axially provided with a fourth fixed groove 156 to fix the shaft core 152 on the output shaft of the motor (not shown in the figure). Thus with reference to FIG. 4, the rotating shaft 150 successively runs in the shaft holes 111 and 121, so that the first housing 110 and the second housing are locked and fixed to form a receiving space 120, which is a sealed space with excellent water resistance, prevents the parts in the receiving space from rusting caused by oxidation, and improves the durability of the disc power generator.

The first fixed flange 153 on the shaft core seat 151 fixedly runs in the mounting hole 143 and runs through the board 141. The first fixed flange 153 runs through the protruding part of the board 141, fixedly runs on the second bearing 157, and fixedly runs in the third fixed groove 155 of the shaft core 152, so as to fixedly mount the rotating shaft 150 on the board 141, so that the armature 140 can rotate through the rotating shaft 150 in relation to the first magnet set 130 and the second magnet set 131.

With reference to FIG. 1, on the board 141, multiple coils 160 are fixedly mounted at the center of the board between the first magnet set 130 and the second magnet set 131, each coil 160 is in a planar spiral form, and all coils 160 are arranged at equal intervals in a circumferential form on a same plane parallel to the board 141.

Preferably, in this embodiment, the side face of the fixed station 142 is provided with multiple axially extending wavy teeth 144 arranged at equal intervals in a circumferential form on a same plane with the axis of the fixed station 142 as the center of a circle. On the side face of the fixed station 142 between each adjacent wavy teeth there is a holding surface 145 formed for the coils 160 to hold against. On the board 141 outside the fixed station 142 there are multiple second fixed flanges 146 arranged on the same plane at equal intervals in a circumferential form with the center of the board 141 as the center of the circle and corresponding to the wavy teeth 144. The holding surface 145 between each adjacent wavy teeth 144 and the fixed flanges 146 corresponding to each adjacent wavy teeth 144 form a fixed cavity 147 to fix the coils 160, so that the outer edge of the coils 160 are respectively held against the holding surface 145 of the fixed station 142 and the sidewalls of the corresponding fixed flanges 146. Further, in the fixed cavity 147 there is a straight strip locating flange 148 used to position the coil 160, and the middle part of the coil 160 is closely stuck to the locating flange 148 by glue. 18 coils 160 are fixed on the board 141. The ratio of the number of the coils 160 to the number of the first magnets 132a in the first magnet set 130 is 3:2.

Figure 5:
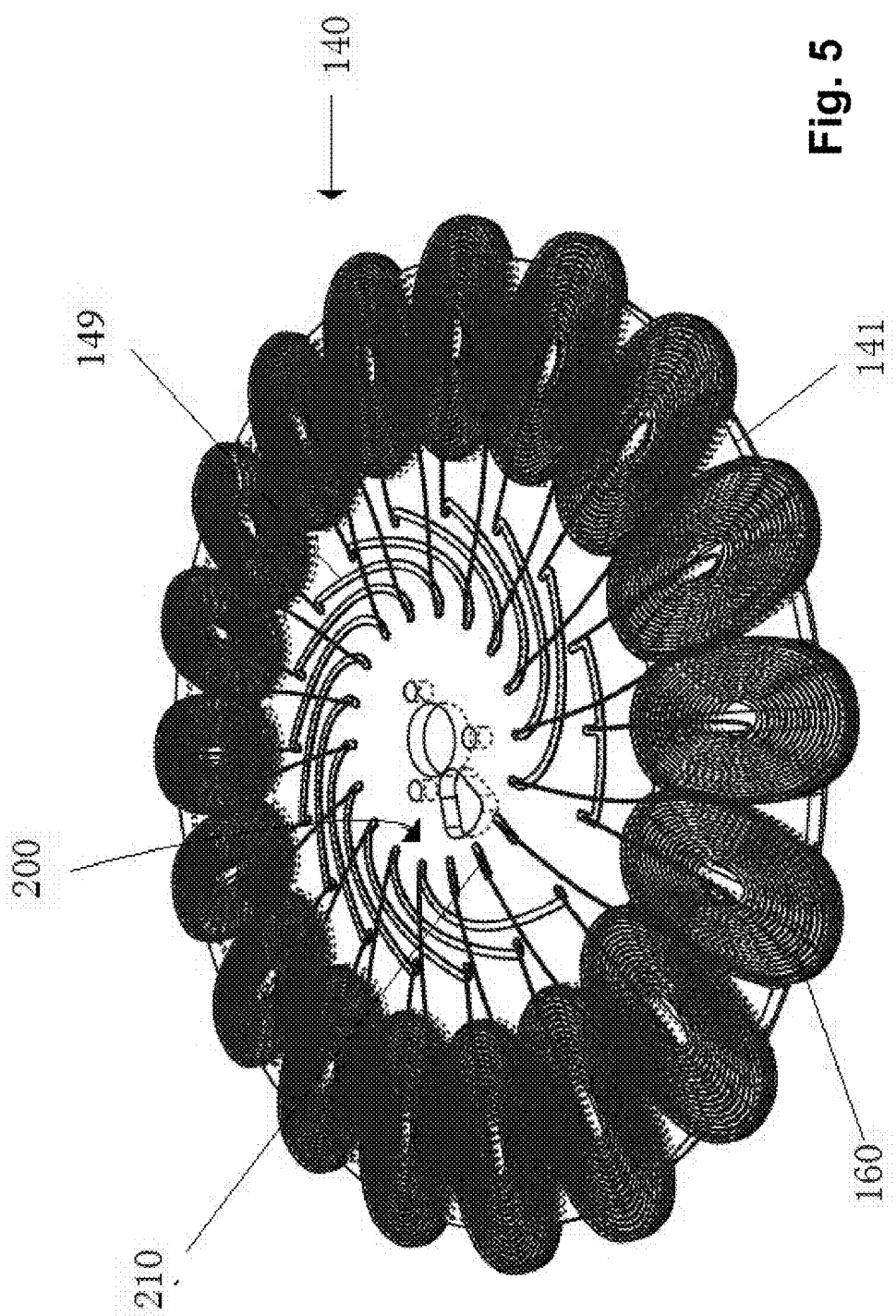
FIG. 5 is the schematic diagram of the armature as shown in FIG. 1.

With reference to FIG. 5, multiple coils 160 are electrically connected with each other through the circuit on the board 141, and through rotation of the armature 140 produce unidirectional alternating current. The board 141 may not need to be printed with circuits, but with multiple mounting holes or grooves arranged on the board 141 to respectively fix multiple coils 160, and with the multiple coils 160 electrically connected together with wire.

Preferably, in this embodiment, the board 141 is equipped with a bonding pad set 200, the bonding pad set 200 comprising three bonding pads 210 used for current output. Each coil 160 has a first tap derived from the center part of the coil 160 (i.e. the position close to the planar spiral center of the coil) of the coil 160 and a second tap derived from the side of the coil 160.

All of the coils 160 fixed on the board 141 have the same winding direction, and are divided into a first coil assembly, a second coil assembly and a third coil assembly. The first coil assembly, the second coil assembly and the third coil assembly comprise equal number of the coils 160, and the coils 160 in the first coil assembly, the coils 160 in the second coil assembly and the coils 160 in the third coil assembly are alternately arranged in a circumferential form. The first tap of the first coil 160 in the first coil assembly, the first tap of the first coil 160 in the second coil assembly and the first tap of the first coil 160 in the third coil assembly are electrically connected together. The second tap of the first coil 160 in the first coil assembly is electrically connected to the first tap of the next coil 160 in the first coil assembly, likewise, the second tap of each coil 160 in the first coil assembly is electrically connected to the first tap of the next coil 160, and the second tap of the last coil 160 in the first coil assembly is electrically connected to one of the bonding pads 210 in the bonding pad set 200. The second tap of the first coil 160 in the second coil assembly is electrically connected to the first tap of the next coil 160 in the second coil assembly, likewise, the second tap of each coil 160 in the second coil assembly is electrically connected to the first tap of the next coil 160, and the second tap of the last coil 160 in the second coil assembly is electrically connected to another of the bonding pad 210 in the bonding pad set 200. The second tap of the first coil 160 in the third coil assembly is electrically connected to the first tap of the next coil 160 in the third coil assembly, likewise, the second tap of each coil 160 in the third coil assembly is electrically connected to the first tap of the next coil 160, and the second tap of the last coil 160 in the third coil assembly is electrically connected to the third bonding pad 210 in the bonding pad set 200.

In order to allow a clearer circuit connection between coils 160, printed circuits on the board 141 include a plurality of helix circuit segments 149 arranged in a circumferential form, and both ends of each helix circuit segment 149 respectively correspond to two alternate coils 160.

Figure 6:
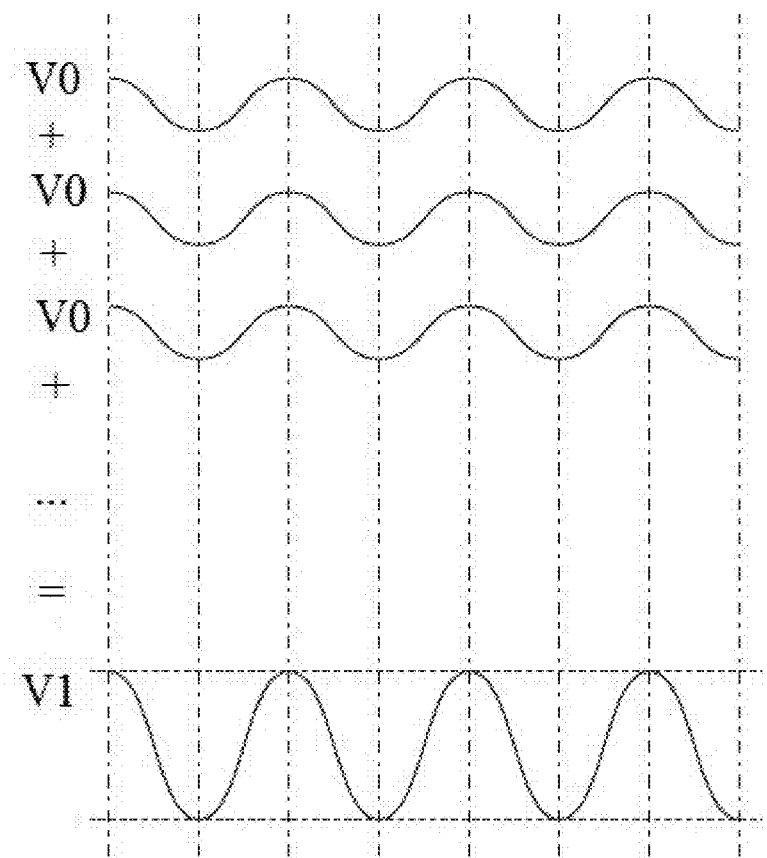
FIG. 6 is the schematic diagram of a single-phase voltage output by the disc power generator as shown in FIG. 1.

In this embodiment, when the armature 140 rotates, among all coils 160 on the board 141, if counting from any one of the bonding pads 210 in the bonding pad set 200 directly connected to the coil 160, the third coil 160 after every two coils 160 produces the induction voltage V0 of the same phase as the first counted coil 160, these induction voltages V0 can be directly summed together to become a single-phase voltage V1 of the disc power generator, as shown in FIG. 6. The phase difference of the voltage generated by any adjacent two coils 160 is $\frac{2}{3}\pi$.

Figure 7:
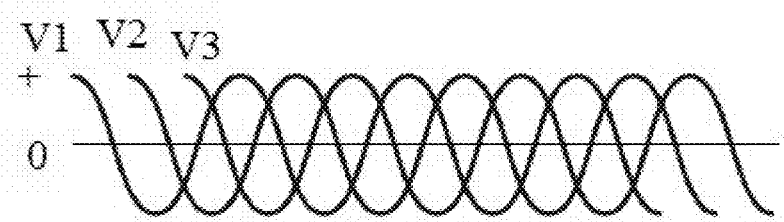
FIG. 7 is the schematic diagram of the three-phase AC voltage output by the disc power generator as shown in FIG. 1.
Figure 8:
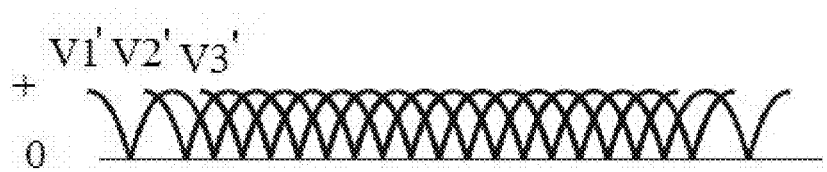
FIG. 8 is the schematic diagram of ballasted voltage output by the disc power generator as shown in FIG. 1.
Figure 9:
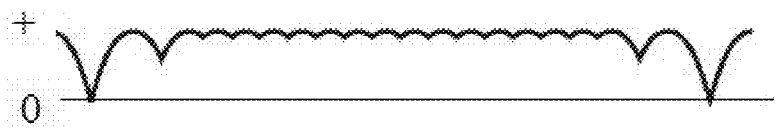
FIG. 9 is the schematic diagram of the confluence of the ballasted voltage output by the disc power generator as shown in FIG. 1.

Thus, the disc power generator provided in this invention outputs three-phase AC voltages V1, V2 and V3 through the bonding pad set 200, as shown in FIG. 7, which are then ballasted to get voltages V1', V2' and V3' as shown in FIG. 8, and finally the voltages V1', V2' and V3' are confluent to form the voltage output of the disc power generator as shown in FIG. 9. As can be seen from FIG. 9, the voltage output of the disc power generator is very stable.

The disc power generator of this invention uses multiple smaller platelike magnets 132a and 132b to replace larger annular magnetic pole rotors found in existing prior art to generate a magnetic field, so as to reduce the total use of magnetic materials and reducing production costs. Moreover, multiple spiral coils 160 distributed on a same plane are used to replace the three-dimensional, larger cylindrical coils found in existing prior art, which helps to reduce the overall size, and is more convenient for assembly.

The disc power generator uses the board 141, and coils 160 are uniformly distributed on the board 141 in a circumferential form. With this structure, the armature 140 may rotate more stably, so as to minimize the distance between the first magnet set 130 and the second magnet set 131, and also reduce heat generation. With this structure, the power generator won't produce phase-shifting voltage, and directly outputs maximum voltage. Further, in this invention, the number of the first magnets 132a in the first magnet set 130 is even, and the number of coils 160 fixed on the board 141 is more than the number of the first magnets 132a in the first magnet set 130. Preferably, in this embodiment, the ratio of the number of coils 160 fixed on the board 141 to the number of the first magnets 132a in the first magnet set 130 is 3:2. With this structure, the armature 140 is insusceptible to magnetic reluctance, and rotates more stably. The ratio of the number of coils 160 fixed on the board 141 to the number of the first magnets 132a in the first magnet set 130 may also be more than 3:2. In this case, efficiency of the disc power generator will decrease, but the output voltage will be more stable.

Those skilled in the art may make improvements or alterations to the above description, but all these improvements or alterations shall fall within the scope of protection of the appended claims of this invention.

The invention claimed is:

1. A disc power generator, comprising a first housing and a second housing; wherein the said first housing and the said second housing are locked and fixed together to enclose a receiving space; wherein a middle part of the said first housing and the said second housing have shaft holes arranged respectively in the middle part of the first housing and the second housing; wherein the said first housing and the said second housing are stamped metal components; wherein the said disc power generator further comprises a first magnet set and a second magnet set fixedly provided in the receiving space; wherein the said first magnet set comprises multiple platelike first magnets each having two poles and arranged at equal intervals in a circumferential form on a same plane, and the said second magnet set comprises multiple platelike second magnets each having two poles and arranged at equal intervals in a circumferential form on a same plane; wherein the said first magnet set is located on a plane parallel to the plane where the said second magnet set is located, and the two magnetic poles of any one of the said first magnets are arranged in a direction perpendicular to the plane where the said first magnet set is located, and the two magnetic poles of any one of the said second magnets are arranged in a direction perpendicular to the plane where the said second magnet set is located, and a unidirectional magnetic field is formed between the said first magnet set and the said second magnet set; wherein between the said first magnet set and the said second magnet set there is a disc-shaped armature arranged parallel to the plane where the said first magnet set is located; wherein the said armature comprises a disc-shaped board parallel to the plane where the said first magnet set is located; wherein at a middle part of the said board there is a rotating shaft that is fixedly axially mounted; wherein the shaft has opposed ends and both ends of the said rotating shaft respectively rotatably run in the said shaft holes; wherein on the said board, multiple coils are fixedly mounted at the center of the said board between the said first magnet set and the said second magnet set, and are arranged at equal intervals in a circumferential form on a same plane; wherein the said coils are in a spiral form and are on the same plane parallel to the said board; wherein the said multiple coils are electrically connected, and through rotation of the said armature generate alternating current, wherein on the inner wall of the said first housing and the said second housing there is a first fixed groove arranged corresponding to the said first magnet set and a second fixed groove arranged corresponding to the said second magnet set; wherein the said multiple first magnets are fixedly inserted in the said first fixed groove to form the said first magnet set; wherein the said multiple second magnets are fixedly inserted in the said second fixed groove to form the said second magnet set, wherein the said board is disc-shaped, is parallel to the plane where the said first magnet set is located, and is provided with a cylindrical fixed station coaxially connected to the middle part of the board; wherein in the middle part of the said board there is an axially arranged mounting hole running through the board; wherein the said rotating shaft comprises a cylindrical shaft core seat having opposed ends and a cylindrical shaft core having opposed shaft core ends; wherein one end of the said shaft core seat is axially provided with a first fixed flange corresponding to the said mounting hole, while the other end is fixedly sheathed with a first bearing, and rotatably runs in the said shaft hole of the said second housing; wherein one end of the said shaft core is axially provided with a third fixed groove, while the other end rotatably runs in the said shaft hole of the said first housing, and is axially provided with a fourth fixed groove to fix the said shaft core on an output shaft of the motor; wherein the said first fixed flange on the said shaft core seat fixedly runs in the said mounting hole and runs through the said board; wherein the said first fixed flange runs through a protruding part of the said board, fixedly runs on a second bearing, and fixedly runs in the said third fixed groove of the said shaft core.

2. The disc power generator of claim 1, wherein a side face of the said fixed station is provided with multiple axially extending wavy teeth arranged at equal intervals in a circumferential form on a same plane with an axis of the said fixed station as a center of a circle; wherein on the side face of the fixed station between each adjacent said wavy teeth there is a holding surface formed for the said coils to hold against; wherein on the said board outside the said fixed station there are multiple fixed flanges having a fixed flange and a sidewall arranged on a same plane at equal intervals in a circumferential form with the center of the said board as the center of the circle and corresponding to the said wavy teeth; wherein a holding surface between each adjacent said wavy teeth and the said fixed flanges corresponding to each adjacent said wavy teeth form a fixed cavity to fix the said coils, so that the outer edge of the said coils are respectively held against the said holding surface of the said fixed station and the sidewalls of corresponding said fixed flanges.

3. The disc power generator of claim 2, wherein the said board is equipped with a bonding pad set, the said bonding pad set comprising three bonding pads used for current output; wherein each of the said coils has an outer part and a side and has a first tap derived from a center part of the coil and a second tap derived from the side of the coil; wherein all of the said coils fixed on the said board have an identical winding direction, and are divided into a first coil assembly, a second coil assembly and a third coil assembly; wherein the said first coil assembly, the said second coil assembly and the said third coil assembly comprise equal number of the said coils, and the said coils in the said first coil assembly, the said coils in the said second coil assembly and the said coils in the said third coil assembly are alternately arranged in a circumferential form; wherein the first tap of the first coil in the said first coil assembly, the first tap of the first coil in the said second coil assembly and the first tap of the first coil in the said third coil assembly are electrically connected together; wherein the second tap of the first coil in the said first coil assembly is electrically connected to the first tap of the next coil in the said first coil assembly, the second tap of each coil in the said first coil assembly is electrically connected to the first tap of a next coil, and the second tap of the last coil in the said first coil assembly is electrically connected to one of the said bonding pads in the said bonding pad set; the second tap of the first coil in the said second coil assembly is electrically connected to the first tap of a next coil in the said second coil assembly, the second tap of each coil in the said second coil assembly is electrically connected to the first tap of the next coil, and the second tap of the last coil in the said second coil assembly is electrically connected to another of the said bonding pad in the said bonding pad set; the second tap of the first coil in the said third coil assembly is electrically connected to the first tap of the next coil in the said third coil assembly, the second tap of each coil in the said third coil assembly is electrically connected to the first tap of the next coil, and the second tap of the last coil in the said third coil assembly is electrically connected to the third said bonding pad in the said bonding pad set.

4. The disc power generator of claim 3, wherein the said first magnets in the said first magnet set has an even number of magnets and the said coils fixed on the said board have a number of coils more than the number of the said first magnets in the said first magnet set.

5. The disc power generator of claim 4, wherein the number of the said coils fixed on the said board to the number of the said first magnets in the said first magnet set has a ratio of 3:2.

6. The disc power generator of claim 1 wherein the board is made from phenolic resin material.

7. The disc power generator of claim 6 wherein the material is made through thermoplastic curing using urotropine.

* * * * *